(12) United States Patent
Watzer et al.

(10) Patent No.: US 12,313,182 B2
(45) Date of Patent: May 27, 2025

(54) SOLENOID VALVE SYSTEM AND METHOD OF OPERATING A SOLENOID VALVE SYSTEM

(71) Applicant: Festo SE & Co. KG, Esslingen (DE)

(72) Inventors: Tobias Watzer, Deizisau (DE); Jens Engelhardt, Esslingen (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 17/748,537

(22) Filed: May 19, 2022

(65) Prior Publication Data

US 2022/0373097 A1   Nov. 24, 2022

(30) Foreign Application Priority Data

May 20, 2021   (DE) .......................... 102021205142.1

(51) Int. Cl.
*F16K 31/06* (2006.01)
*F16K 37/00* (2006.01)

(52) U.S. Cl.
CPC ...... *F16K 31/0675* (2013.01); *F16K 31/0672* (2013.01); *F16K 37/0041* (2013.01)

(58) Field of Classification Search
None
See application file for complete search history.

(56) References Cited

U.S. PATENT DOCUMENTS

| 6,300,733 | B1 * | 10/2001 | Bergstrom | ............ | H01F 7/1844 |
| | | | | | 318/128 |
| 9,640,311 | B1 * | 5/2017 | Kordik | .................. | B60T 8/1703 |
| 2011/0094589 | A1 | 4/2011 | Jacob et al. | | |

FOREIGN PATENT DOCUMENTS

| DE | 102014117818 A1 | 6/2016 |
| DE | 102015101778 A1 | 8/2016 |
| DE | 102018207417 A1 * | 11/2019 |
| DE | 102018215687 A1 * | 3/2020 |
| WO | 2016012292 A1 | 1/2016 |

* cited by examiner

Primary Examiner — Angelisa L. Hicks
(74) Attorney, Agent, or Firm — Hoffmann & Baron, LLP

(57) ABSTRACT

Solenoid valve system having a solenoid valve and further having a controller, wherein the solenoid valve includes a valve housing through which a fluid channel passes, in which fluid channel a valve member for temporarily sealing a valve seat formed in the fluid channel is movably accommodated, and including a solenoid drive which has a magnetic circuit with a solenoid coil and a linear-movable armature which is coupled to the valve member, the controller provides a coil current to the solenoid coil and is connected to a sensor which provides a sensor signal which is dependent on a movement of the armature, the controller analyzes the sensor signal to determine a movement of the armature, wherein the controller provides a closed loop control for the coil current in the presence of the armature movement.

9 Claims, 2 Drawing Sheets

SOLENOID VALVE SYSTEM AND METHOD OF OPERATING A SOLENOID VALVE SYSTEM

BACKGROUND OF THE INVENTION

The invention relates to a solenoid valve system comprising a solenoid valve and further comprising a controller, the solenoid valve comprising a valve housing through which a fluid channel passes, in which fluid channel a valve member is movably accommodated for temporarily sealing a valve seat, which valve seat is formed in the fluid channel, and further comprising a solenoid drive which comprises a magnetic circuit with a solenoid coil and an armature which is linearly movable between a first functional position and a second functional position, which armature is coupled to the valve member, wherein the controller provides a coil current to the solenoid coil and is connected to a sensor, which sensor provides a sensor signal which is dependent on a movement of the armature, the controller analyzes the sensor signal to determine the movement of the armature. Furthermore, the invention relates to a method for operating a solenoid valve system.

From DE 10 2014 117 818 B4, a circuit arrangement for driving an electromagnetic switching valve is known which, after switching on, triggered by a timer, connects a solenoid coil directly to a supply via a semiconductor switch for the short duration of the pick-up phase of the solenoid valve and, after a defined time interval, switches to a holding phase with reduced holding current, the holding current of the solenoid valve being regulated to a predetermined value by means of a controller comprising a reference voltage source, a transistor and a resistor.

DE 10 2015 101 778 A1 discloses a circuit arrangement for the clocked control of an electromagnetic actuator which, after switching on, triggered by a timing element, connects a solenoid coil directly to a supply via a semiconductor switch of a first circuit part for the short duration of the pick-up phase of the solenoid valve, wherein, after a defined time interval, a second circuit part is activated which essentially consists of an integrated circuit which contains all the technical means for a clocked actuation and actuates the solenoid coil via a second semiconductor switch in such a way that a reduced clocked holding current is set at an exactly predetermined level.

From WO 2016/012292 A1, a method for controlling an electric valve is known, wherein the valve has a switching means and a conductive means, wherein the switching means interacts with an actuating element and in which the following steps are provided: Controlling the actuating element by means of a control signal, determining the current consumption of the actuating element by means of a current measuring means, and changing the voltage and/or the current of the control signal when determining a reduction in the current consumption of the actuating element.

SUMMARY OF THE INVENTION

The object of the invention is to provide a solenoid valve system and a method of operating a solenoid valve system with reduced power consumption.

This task is solved for a solenoid valve system of the type mentioned at the beginning in that the controller controls the coil current during a movement of the armature. In particular the controller provides a closed loop control of the coil current during the movement of the armature.

From the prior art it is known to perform a voltage regulation for the solenoid coil of a solenoid valve system. In a voltage control, the coil current flowing through the solenoid coil is dependent on both the electrical voltage applied to the solenoid coil and induction effects such as may occur, first, when the coil current changes and, second, when the armature moves within the solenoid coil.

In contrast, with a (closed loop) current control according to the invention, it is intended to maintain the coil current in the solenoid coil at a predetermined value or to bring it to this predetermined value, taking into account all effects that contribute to a reduction or increase of the coil current in the solenoid coil. This measure ensures that the magnetic flux provided by the solenoid coil, which determines the magnetic forces acting on the armature, is defined with particular precision. Accordingly, exact positioning of the armature along a path of movement extending between the first functional position and the second functional position, in particular along a straight line, is enabled. Thus, on the basis of the current control for the coil current of the solenoid coil, a precise opening and closing of the valve seat of the solenoid valve can be performed with the aid of the valve member and the associated armature. Preferably, it is provided that the coil current is controlled (closed loop) in such a way that the armature and the associated valve member perform a relative movement with respect to the solenoid coil, whereby a predetermined positioning for the armature and the associated valve member is achieved with a unique magnitude of the coil current. It should be noted here that the valve member needs not necessarily to be rigidly connected to the armature. An elastic coupling can also be provided between the armature and the valve member.

Advantageous further embodiments of the invention are the subject of the sub claims.

Advantageously, the controller is adapted for an open loop control or a closed loop control of a first coil current to cause an initiation of a movement on the armature. Furthermore the controller is adapted for a closed loop control of a second coil current after the movement of the armature has been detected. The second coil current, in particular an absolute value of the second coil current, is chosen to be smaller than a maximum amount of the first coil current. For a quick and reliable transfer of the armature and the valve member connected thereto from the first functional position in the direction of the second functional position, it is advantageous if the controller first provides a first coil current. The first coil current can be selected in such a way that a maximum amount of the first coil current is as close as possible to the load limit for the solenoid coil, in order to cause a rapid build-up of a magnetic field as a result.

This first coil current can either be controlled (open loop) by the controller or regulated (closed loop) by the controller, the absolute value for this first coil current is variable and also depends on the inductance of the magnetic circuit. As soon as a movement of the armature is determined on the basis of a suitable sensor signal, the controller initiates a switchover from the first coil current to a second coil current. An amount, in particular an absolute value, of the second coil current is thereby smaller than a maximum amount of the first coil current. The second coil current is provided by the controller within a closed control loop control based on a current signal representing the current flow through the solenoid coil. A determination of the current flow through the solenoid coil is carried out by means of a current sensor which is electrically connected to the controller and which can be designed, for example, as a measuring coil, which arranged, preferably without direct contact, close to a supply line or drain line of the solenoid coil for inductive current measurement with an associated current measuring sensor or as a measuring resistor arranged in the supply line or drain line of the solenoid coil with an associated voltage measuring sensor.

It is advantageous if the controller provides the second coil current with an intensity of current that amounts to a maximum of 60 percent, preferably to a maximum of 50 percent, particularly preferably to a maximum of 40 percent, especially a maximum of 30 percent, of the maximum intensity of current of the first coil current. The second coil current has a lower absolute value or magnitude than the maximum intensity of current of the first coil current, since an energy requirement for moving the armature and the valve member coupled thereto from the first functional position in the direction of the second functional position is significantly higher at the start of the movement of the armature due to inertia effects and friction effects (in particular taking into account the stick-slip effect, i.e. the static friction between armature and solenoid coil that has to be overcome at the start of the movement) than at a time when the armature is already in motion. There are several advantages associated with reducing the energy input from the time the armature movement is detected. Firstly, this can reduce a speed of the armature when it arrives at the second functional position, which can reduce both a noise emission for the solenoid valve and wear for the armature, the valve member and any sealing diaphragm that may be present. Secondly, this reduces heat input from the solenoid coil to the armature and the valve member connected thereto as well as from the solenoid coil to the valve housing, which is of particular interest when handling thermally unstable fluids to be metered by means of the solenoid valve.

Preferably, it is provided that the second coil current is maintained for a longer period of time, in particular until a time when a transfer of the armature and the valve member connected thereto from the second functional position to the first functional position is required. Preferably, the amount for the second coil current is such that the armature and the valve member coupled thereto remain in the second functional position during an intended use of the solenoid valve as long as the second coil current is provided. Due to the current control for the second coil current, movements of the armature and the valve member coupled thereto from the second functional position in the direction of the first position are largely or completely prevented, since in the event of such a movement of the armature a reduction of the current flow due to induction effects occurs and the controller counteracts this reduction of the current flow and thus moves the armature back into the second functional position.

In a further embodiment of the invention, it is provided that the controller analyzes a current signal from a current sensor for a detection of a movement of the armature and provides the coil current in a controlled (closed loop) manner, which is based on the current signal. In this case, the current signal has two functions, since it is used both for detecting the movement of the armature and for regulating the coil current, in particular the second coil current after the movement of the armature has been detected during the provision of the first coil current.

In one embodiment of the invention, it is provided that the controller is configured for providing the second coil current with a pulse width modulation in a frequency interval between 0 Hz and 100 kHz, in particular between 20 kHz and 70 kHz, and/or with a constant magnitude. Here it is provided that the controller provides a clocked control signal with which a switch, in particular an electronic switch, can be electrically controlled, which in turn can close or interrupt an electrical connection between an electrical energy source and the solenoid coil. Depending on a predetermined pulse frequency as well as on a predetermined pulse-pause ratio for the clocked control signal and the current signal of the current sensor, the desired coil current for the solenoid coil can thus be controlled in a closed control loop.

According to a further aspect, the task of the invention is solved by a method for operating a solenoid valve system in which a valve member is moved from a first functional position to a second functional position by an armature of a magnetic circuit, which magnetic circuit comprises a solenoid coil, with the following steps: providing a first coil current from a controller to the solenoid coil for initiating a movement of the armature from the first functional position in the direction of the second functional position, providing a sensor signal which is dependent on the movement of the armature by means of a sensor and providing the sensor signal to the controller, detecting the movement of the armature coupled to the valve member on the basis of the sensor signal, providing a predetermined closed loop second coil current from the controller to the solenoid coil within a predetermined time interval, which starts with the detection of the movement of the armature coupled to the valve member. Preferably, the time interval is selected such that a switchover from the first coil current to the second coil current occurs at a time when the armature has reached a predetermined state of motion or a predetermined position between the first functional position and the second functional position, from which predetermined position the armature can arrive at the second functional position as the desired target position even though the coil current is reduced to the magnitude of the second coil current.

In a further development of the method, it is provided that the controller detects the coil current and that the detection of the movement of the armature coupled to the valve member is carried out on the basis of an inflection point in a time course of the coil current. The controller is set up to carry out a determination of a gradient for a course curve of the coil current by comparing one or more temporally preceding (older) measured values for the coil current with the currently (presently) measured value for the coil current. In the event of a change in sign for the determined gradient, the controller draws the conclusion that a movement of the armature has taken place, since due to the counter-induction in the solenoid coil associated with an armature movement there is an at least brief drop in the magnitude of the coil current, which initially rises steadily after the coil current is switched on.

In a further embodiment of the method, it is provided that the predetermined time interval is selected to be greater than a movement duration for the armature between the first functional position and the second functional position. This ensures that the switchover between the first coil current and the second coil current does not take place until the armature has been reliably transferred to the second functional position.

In an advantageous further development of the method, it is provided that the current control (closed loop) for the second coil current is maintained after the second functional position has been reached until a time at which a transfer of the armature and the valve member coupled thereto from the second functional position to the first functional position is carried out. This measure ensures that, in the event of external accelerations acting on the solenoid valve which may cause the armature to move, the armature is maintained in the second functional position or is rapidly moved back to the second functional position.

Preferably, for the method it is provided that the controller performs a pulse width modulation for the coil current in a frequency interval between 0 Hz and 100 kHz, in particular between 20 kHz and 70 kHz.

BRIEF DESCRIPTION OF THE DRAWINGS

An advantageous embodiment of the invention is shown in the drawing. Here shows.

DETAILED DESCRIPTION

Figure 1:
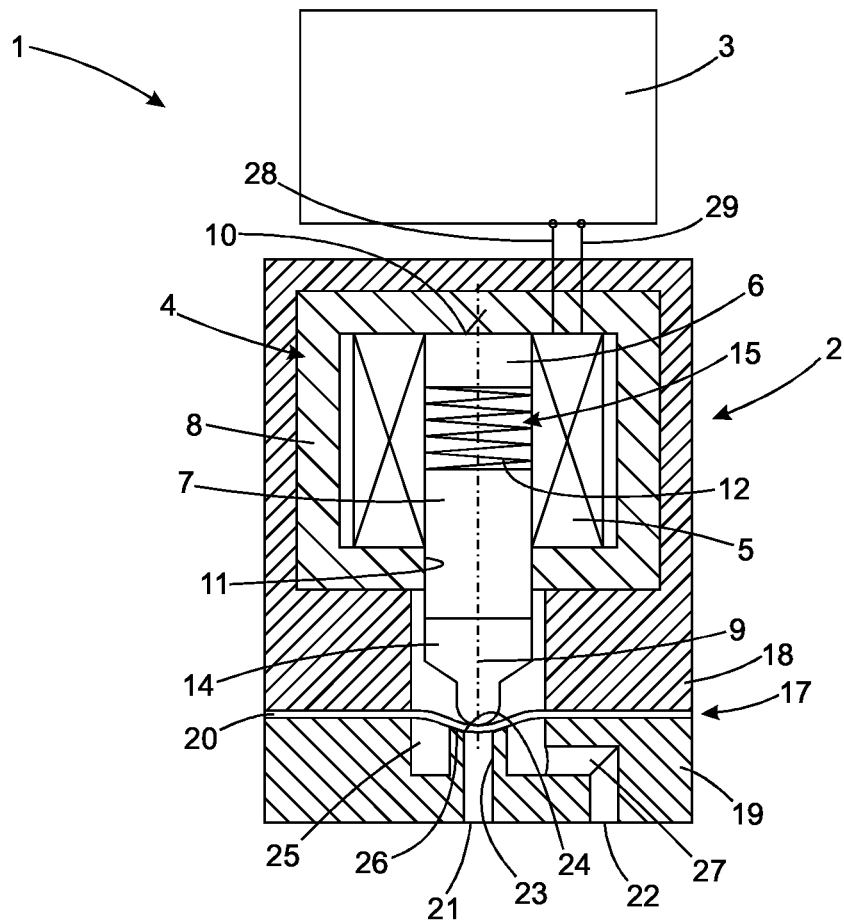
FIG. 1 a strictly schematic representation of a solenoid valve designed as a diaphragm valve, FIG. 2 a strictly schematic representation of the essential functional components of the controller, and FIG. 3 a strictly schematic representation of a current-time diagram.

A solenoid valve system 1 shown in FIG. 1 comprises a solenoid valve 2 and a controller 3 which is electrically connected to the solenoid valve 2. Purely by way of example, it is provided that the solenoid valve 2 is designed as a diaphragm valve, in which a flexible, in particular rubber-elastic, diaphragm 20 is accommodated in a sealing manner between a first valve housing part 18 and a second valve housing part 19 of a valve housing 17.

Purely by way of example, a first fluid connection 21 and a second fluid connection 22 are formed on the valve housing 17. By way of example, it is provided that the first fluid connection 21 opens into a fluid channel 23 which is formed in the form of a sleeve in some regions and, for its part, has an orifice 24 which opens into a valve chamber 25. In a purely exemplary manner, the orifice 24 is formed on an annular end face 26 of the fluid channel 23 and is also referred to as a valve seat. The valve chamber 25 extends coaxially with the fluid channel 23 and is fluidically connected to the second fluid port 22 via a fluid line 21.

The diaphragm 20, which is made of a rubber-elastic material, is arranged adjacent to the annular end face 26 of the fluid passage 23 in such a manner that it can be sealingly pressed onto the annular end face 26 by elastic deformation. In order to be able to cause this sealing effect, the solenoid valve 2 is provided with a solenoid drive 4. The solenoid drive 4 comprises a solenoid coil 5, a solenoid core 6, a movably mounted armature 7 and a yoke 8, which is designed with a rectangular profile in a purely exemplary manner Exemplarily, the solenoid coil 5 is formed as an arrangement of a plurality of wire windings, not shown, which in their entirety form a circular cylindrical sleeve extending coaxially to a longitudinal axis 9. Furthermore, both the magnetic core 6 and the armature 7 are each formed rotationally symmetrically with respect to the longitudinal axis 9 and are made of a magnetic flux conducting material. The magnetic core 6 is accommodated in a stationary manner in the solenoid coil 5, while the armature 7 is mounted in the solenoid coil 5 so as to be linearly movable along the longitudinal axis 9.

An end face 10 of the magnetic core 6 facing away from the armature 7, for example having a flat design, is in surface contact with the yoke 8 made of magnetic flux conducting material. The yoke 8 surrounds the solenoid coil 5, is formed with a rectangular profile in the plane of representation of FIG. 1 and is provided with a bore or recess 11 formed coaxially to the longitudinal axis 9, through which the armature 7 passes. In order to provide a preferred position for the armature 7, a spring 12, in particular a helical spring, is arranged between the armature 7 and the magnetic core 6, which spring 12 has an internal prestress and which presses a valve member 14, which is firmly connected to the armature 7 in a purely exemplary manner, onto the diaphragm 20 when the solenoid coil 5 is de-energized, so that the diaphragm 20 bears sealingly against the annular end face 26.

In this rest position, also referred to as the first functional position, of the solenoid valve 2, which can thus be described as normally closed, a fluidically communicating connection between the first fluid connection 21 and the second fluid connection 22 is interrupted.

In order to allow fluid flow from the first fluid port 21 to the second fluid port 22 or in the reverse direction, it is necessary to cancel the sealing effect between the diaphragm 20 and the annular end face 26 of the fluid channel 23 serving as the valve seat. For this purpose, it is necessary to transfer the armature 7 from the first functional position as shown in FIG. 1 to a second functional position (not shown). In the second functional position a distance between the armature 7 and the magnetic core 6 is reduced (compared with the first functional position) and the spring 12 is compressed. In order to cause this transfer of the armature 7, it is intended to provide a coil current from the controller 3 to the solenoid coil 5 in order to thereby cause a magnetic flux in the magnetic core 6, in the yoke 8 as well as in the armature 7. Since the magnetic flux must overcome an air gap 15 between the armature 7 and the magnetic core 6, an attractive force occurs between the armature 7 and the magnetic core 6. This attractive force can be used to cause an elastic deformation of the spring 12 and thus the approach of the armature 7 to the magnetic core 6 as well as the lifting of the diaphragm 20 from the circular ring-shaped end face 26.

For carrying out this approach process between armature 7 and magnetic core 6, the controller 3 is designed to provide a coil current to the solenoid coil 5 via connecting leads 28, 29.

Figure 2:
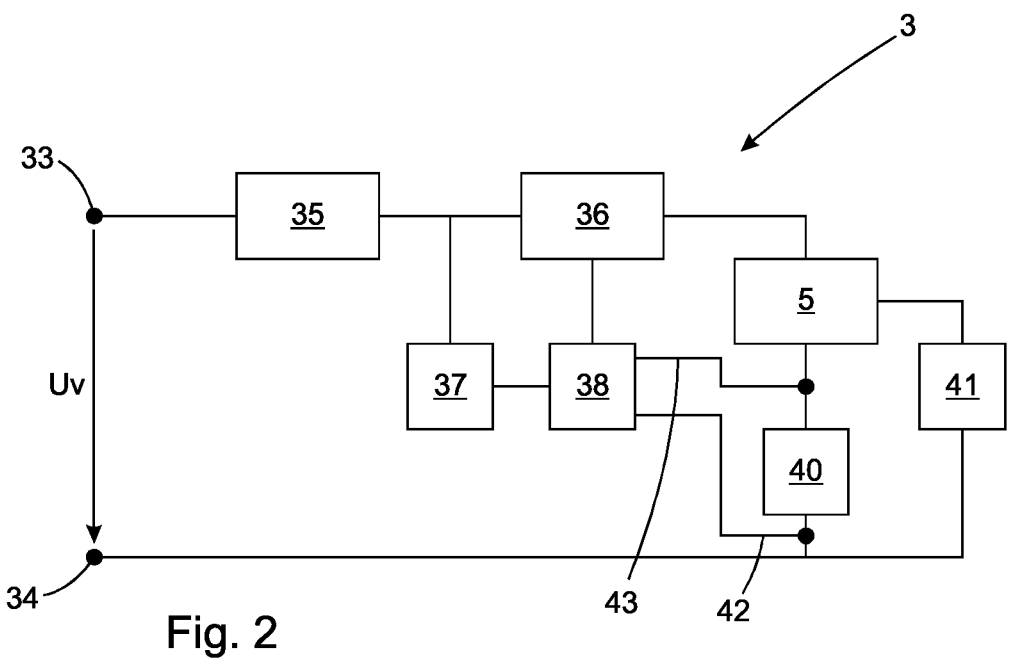

A schematic design for the controller 3 can be seen in FIG. 2. It should be mentioned here that an electrical supply voltage Uv is only provided for the controller 3 between an input terminal 33 and an earth terminal 34 when control of the solenoid valve 2 is actually provided. In the remaining time it is not necessary to provide a supply voltage Uv to the controller 3.

By way of example, it is provided that downstream of the input connection 33 an input filter 35 is provided, the task of which is to attenuate or preferably completely eliminate interference radiation input which can act on the controller 3 from outside as well as interference radiation output which can be caused by the controller 3. Downstream of the input filter 35, a branch is provided to a final stage 36 and a voltage supply module 37, wherein the final stage 36 can have one or more electrically controllable switches, and wherein the voltage supply module 37 is designed to provide a stable supply voltage to a downstream microcontroller 38. The microcontroller 38 is electrically connected to the output stage 36 and provides drive signals, in particular pulse-width modulated drive signals, to the output stage 36 to enable current flow from the input terminal 33 to the solenoid coil 5, coupled to the output stage 36, of the solenoid valve not further shown in FIG. 2. The solenoid coil 5 is connected on the one hand to the output stage 36 and on the other hand via a measuring resistor 40 to the ground connection 34. This enables current to flow from the input terminal 33 through the output stage 36, the solenoid coil 5 and the measuring resistor 40 to the output terminal 34 in the presence of a suitable drive signal provided by the microcontroller 38.

A freewheeling diode 41 is arranged in parallel with the series connection of solenoid coil 5 and measuring resistor 40, which can dissipate the current occurring due to the reverse insulation of solenoid coil 2 when the power supply to solenoid coil 5 is turned off.

The measuring resistor 40 is electrically connected to the microcontroller 38 via measuring leads 42, 43 and is used to detect a current-dependent voltage drop, this voltage drop being determined by the microcontroller 38 and being able to be used as a measure of the current flow through the solenoid coil 5.

Figure 3:
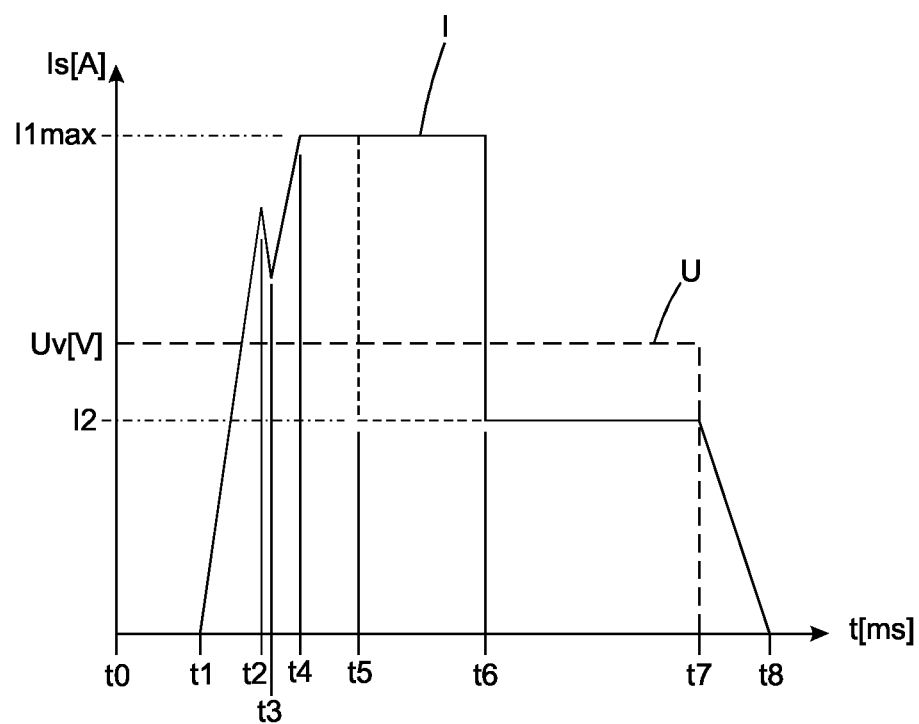

According to the representation of FIG. 3, in which a current-time diagram is shown in which the course of the supply voltage Uv is also drawn, the supply voltage Uv is provided at a time t0 and is switched off again at a time t7.

Shortly after the supply voltage Uv is provided, a drive signal is provided from the microcontroller 38 to the output stage 36 after an initialization of the microcontroller 38. This results in a release of a coil current by the output stage 36 at time t1, whereby this coil current is provided to the solenoid coil 5. Since the solenoid coil 5 opposes its self-induction to an externally imposed current flow, there is a linear increase in the coil current between time t1 and time t2 in the schematic and idealized representation of FIG. 3. At time t2, the magnetic flux in the air gap 15, as shown in FIG. 1, has increased to such an extent that the armature 7 overcomes the static friction with respect to the yoke 8 and the solenoid coil 5 as well as the restoring force of the spring 12 and starts to move in the direction of the magnetic core 6.

This movement of the armature 7 in the solenoid coil 5 causes an additional induction in the solenoid coil 5, which manifests itself in a current that is opposite to the current impressed on the solenoid coil 5. Accordingly, as shown in FIG. 3, there is a temporary reduction in the coil current from time t2 onwards, which also manifests itself in a decreasing voltage drop across the measuring resistor 40. This voltage drop is detected in the microcontroller 38 by comparing the currently measured voltage with voltages measured previously in time. For a time characteristic of the coil current provided to the solenoid coil 5, which is calculated on the basis of the voltage drop determined at the measuring resistor 40, there is thus a sign change for the slope of the current curve at time t2, whereby this sign change can be used as a trigger signal for the microcontroller 38 to provide current control (closed loop) for the solenoid valve 2 from time t5.

As can be seen from the schematic representation of FIG. 3, the coil current initially drops from time t2 due to the relative movement of the armature 7 with respect to the solenoid coil 5 until the armature 7 has reached the second functional position at time t3, in which, deviating from the purely exemplary representation of FIG. 1, there is a minimum air gap 15 between the armature 7 and the solenoid core 6. From time t3, the coil current in the solenoid coil 5 increases again due to the armature 7 now coming to a standstill again, until a maximum amount I1 max for the coil current I1 is reached at time t4.

In the event that the microcontroller 38 is unable to determine the voltage drop across the measuring resistor 40, or at least is unable to determine it reliably, a switchover from the first coil current I1 to a reduced and constant coil current I2, which is also referred to as the holding current, takes place at a time t6. This time t6 may be permanently programmed into the microcontroller 38 and is selected such that the armature 7 has reached the second functional position with a high degree of reliability.

If, on the other hand, it is the case that the microcontroller 38 can reliably determine the voltage drop across the measuring resistor 40 and thus the current flow through the solenoid coil 5, a switchover from the first coil current I1 to the reduced and constant second coil current I2 takes place at a time t5 which is significantly earlier in time than the time t6. Exemplarily, it is provided that between the time t2 and the time t5 there is a fixed time interval delta-t (=t5−t2), which is stored in the microcontroller 38. It is particularly advantageous if different time periods delta-t are stored in the microcontroller 38 for different solenoid valve types.

Exemplarily, it can be provided that the microcontroller 38 can make a determination of the connected solenoid valve type on the basis of the curve for the coil current I1 and can automatically make a selection of the time period delta-t for this case.

What is claimed is:

1. A solenoid valve system comprising a solenoid valve and further comprising a controller, the solenoid valve comprising a valve housing through which a fluid channel passes, in which fluid channel a valve member is movably accommodated for temporarily sealing a valve seat, which valve seat is formed in the fluid channel, the solenoid valve further comprising a solenoid drive which comprises a magnetic circuit with a solenoid coil and an armature, which armature is linearly movable between a first functional position and a second functional position and which armature is coupled to the valve member, wherein the controller provides a coil current to the solenoid coil and is connected to a sensor, which sensor provides a sensor signal which is dependent on a movement of the armature, wherein the controller provides an open loop control or a closed loop control of a first coil current to cause an initiation of a movement on the armature, and wherein the controller analyzes the sensor signal to determine the movement of the armature and wherein the controller provides a closed loop control of a second coil current after the movement of the armature has been determined, and wherein an absolute value of the second coil current is smaller than a maximum amount of the first coil current.

2. The solenoid valve system according to claim 1, wherein the absolute value of the second coil current amounts at most 60 percent of the maximum amount of the first coil current.

3. The solenoid valve system according to claim 1, wherein the sensor is a current sensor and wherein the controller analyzes a current signal from the current sensor for detecting movement of the armature and for a closed loop control of the second coil current.

4. The solenoid valve system according to claim 1, wherein the controller provides the second coil current with a pulse width modulation in a frequency interval between 0 Hz and 100 kHz and/or with a constant magnitude.

5. A method for operating a solenoid valve system, in which a valve member is moved by an armature of a magnetic circuit, which is equipped with a solenoid coil, from a first functional position into a second functional position, comprising the steps:

providing a first coil current from a controller to the solenoid coil for initiating a movement of the armature from the first functional position into the second functional position, determining a sensor signal dependent on the movement of the armature with a sensor and providing the sensor signal to the controller, detecting the movement of the armature coupled to the valve member on the basis of the sensor signal, providing a closed loop control of a predetermined second coil current from the controller to the solenoid coil in a predetermined time interval after the detection of the movement of the armature coupled to the valve member, wherein an absolute value of the second coil current is smaller than a maximum amount of the first coil current.

6. The method according to claim 5, wherein the controller detects the coil current and wherein the detection of the movement of the armature coupled to the valve member is carried out on the basis of an inflection point in a time characteristic of the coil current.

7. The method according to claim 5, wherein the predetermined time interval is selected to be greater than a movement duration for the armature between the first functional position and the second functional position.

8. The method according to claim 5, wherein the closed loop current control for the second coil current is maintained after reaching the second functional position until a time at which a transfer of the armature and the valve member coupled thereto from the second functional position to the first functional position is carried out.

9. The method according to claim 5, wherein the controller performs a pulse width modulation for the coil current in a frequency interval between 0 Hz and 100 kHz.

\* \* \* \* \*